US010055142B1

(12) United States Patent
Bates

(10) Patent No.: US 10,055,142 B1
(45) Date of Patent: Aug. 21, 2018

(54) APPARATUS AND METHOD FOR COMMAND PROCESSING FOR A FAST BLOCK INPUT/OUTPUT DEVICE

(71) Applicant: Maxlinear Asia Singapore PTE LTD, Singapore (SG)

(72) Inventor: Stephen Bates, Canmore (CA)

(73) Assignee: MAXLINEAR ASIA SINGAPORE PTE LTD., Singapore (SG)

( * ) Notice: Subject to any disclaimer, the term of this patent is extended or adjusted under 35 U.S.C. 154(b) by 177 days.

(21) Appl. No.: 14/881,700

(22) Filed: Oct. 13, 2015

(51) Int. Cl.
G06F 13/28 (2006.01)
G06F 3/06 (2006.01)
G06F 13/42 (2006.01)

(52) U.S. Cl.
CPC .......... *G06F 3/0613* (2013.01); *G06F 3/0658* (2013.01); *G06F 3/0659* (2013.01); *G06F 3/0679* (2013.01); *G06F 13/28* (2013.01); *G06F 13/4282* (2013.01)

(58) Field of Classification Search
CPC ... G06F 9/45558; G06F 3/0688; G06F 3/0656
USPC ........................................................ 710/316
See application file for complete search history.

(56) References Cited

U.S. PATENT DOCUMENTS

| 8,819,335 | B1 | 8/2014 | Salessi et al. | |
| 2002/0040418 | A1* | 4/2002 | Bress | G06F 3/0622 711/112 |
| 2013/0024595 | A1* | 1/2013 | Subramaniyan | G06F 13/28 710/308 |
| 2013/0145085 | A1* | 6/2013 | Yu | G06F 12/0246 711/103 |
| 2014/0129753 | A1 | 5/2014 | Schuette et al. | |
| 2014/0181327 | A1* | 6/2014 | Cohen | G06F 3/0679 710/5 |
| 2014/0215129 | A1* | 7/2014 | Kuzmin | G06F 12/0246 711/103 |
| 2014/0331014 | A1 | 11/2014 | Liao | |

(Continued)

OTHER PUBLICATIONS

"PCI Express", https://en.wikipedia.org/wiki/PCI_Express, Retrieved Online Jun. 2015, 24 pages.

(Continued)

*Primary Examiner* — Titus Wong
(74) *Attorney, Agent, or Firm* — McAndrews, Held & Malloy, Ltd.

(57) ABSTRACT

A system, device and method are provided for command processing for a fast block input/output (I/O) device, such as a solid state hard drive (SSD). A bridge device is directly connected to the fast block I/O device and configured to intercept a command sent from a controller to the fast block I/O device and to process the command within the bridge device. The bridge device can process the command independent of interaction with the controller. Processing the command can include copying or moving data, performing protocol translation, performing data manipulation, or performing near-data processing, including performing a context-aware service. Near-data processing comprises processing the command within the bridge device, instead of on the fast block I/O device or the controller, which provides advantages of in-situ processing without the limitations associated with processing performance on the fast block I/O device.

19 Claims, 9 Drawing Sheets

(56) References Cited

U.S. PATENT DOCUMENTS

2014/0337540 A1* 11/2014 Johnson ............... G06F 13/385
                                                         710/5

OTHER PUBLICATIONS

Huffman, "NVM Express", Sep. 23, 2013, pp. 1-166, Revision 1.1a.
Alves, PhD., et al., "In-Situ Processing—Bringing Intelligence to Storage", Flash Memory Summit 2014, 25 pages, Santa Clara, CA.
"POWER8 Coherent Accelerator Processor Interface (CAPI)", http://www-304.ibm.com/webapp/set2/sas/f/capi/home.html, Retrieved Online Jun. 2015, 1 page.

* cited by examiner

US 10,055,142 B1

APPARATUS AND METHOD FOR COMMAND PROCESSING FOR A FAST BLOCK INPUT/OUTPUT DEVICE

FIELD

The present disclosure relates to storage devices and communication therewith, including but not limited to command processing for a fast block input/output (I/O) device.

BACKGROUND

Electronic information is stored for many different applications and for a large number of users. Such information should be easily accessible and is often stored in one or more backup copies. With cloud storage and data center usage on the rise, there is more focus on the communication with the storage devices.

As data storage needs increase, there is an increasing role for the framework surrounding communication with storage systems. For example, NVM Express (Non-Volatile Memory Express, or NVMe) is a standard that runs over PCIe (Peripheral Component Interconnect Express) and is used to communicate with fast block I/O devices, such as solid state hard drives (SSDs).

There is a trend within the storage industry towards "in-situ" processing, or processing data on the SSD rather than having to transfer it to a central processing unit (CPU) for processing. In addition, there is a trend towards new host-interfaces such as IBM Coherent Application Processing Interface (CAPI), which are not compatible with NVMe.

Improvements in command processing for fast block I/O devices are desirable.

BRIEF DESCRIPTION OF THE DRAWINGS

Embodiments of the present disclosure will now be described, by way of example only, with reference to the attached Figures.

DETAILED DESCRIPTION

Figure 1:
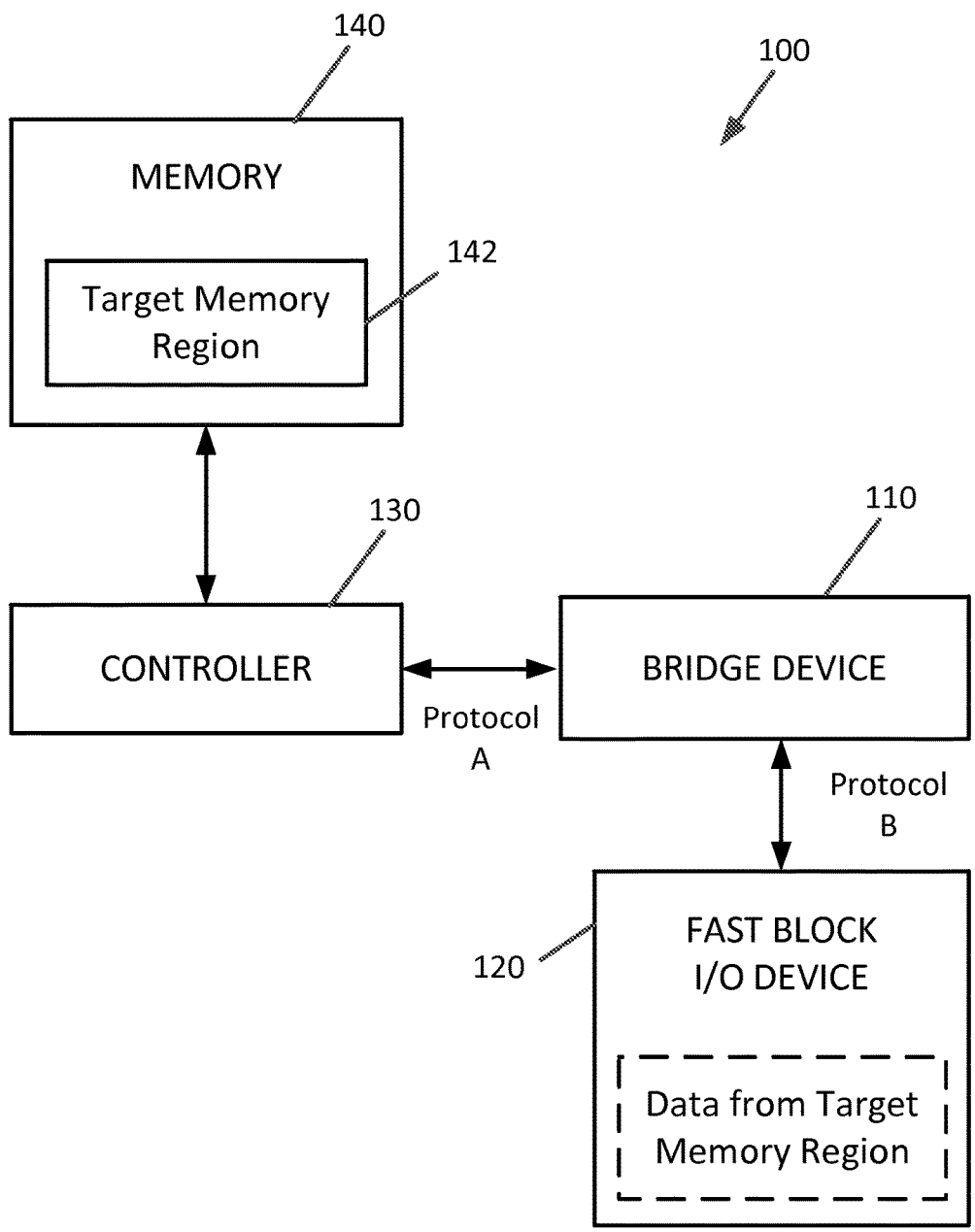
FIG. 1 illustrates a system according to an embodiment of the present disclosure including a bridge device.

A system, device and method are provided for command processing for a fast block input/output (I/O) device, such as a solid state hard drive (SSD). A bridge device is directly connected to the fast block I/O device and configured to intercept a command sent from a controller to the fast block I/O device and to process the command within the bridge device. The bridge device can process the command independent of interaction with the controller. Processing the command can include copying or moving data, performing protocol translation, performing data manipulation, or performing near-data processing, including performing a context-aware service. Near-data processing comprises processing the command within the bridge device, instead of on the fast block I/O device or the controller, which provides advantages of in-situ processing without the limitations associated with processing performance on the fast block I/O device.

In an embodiment, the present disclosure provides a system comprising: a controller; a fast block input/output (I/O) device; and a bridge device directly connected to the fast block I/O device and in communication with the controller. The bridge device is configured to intercept a command sent from the controller to the fast block I/O device and to process the command within the bridge device.

In an example embodiment, the bridge device is configured to obtain drive data from the fast block I/O device to process the command within the bridge device independent of interaction with the controller.

In an example embodiment, the bridge device is configured to perform a protocol translation between a first protocol used for communication with the controller and a second protocol used for communication with the fast block I/O device.

In an example embodiment, the bridge device is configured to perform data manipulation on data as it flows between the controller and the fast block I/O device.

In an example embodiment, the bridge device is configured to perform near-data processing whereby data is read from the fast block I/O device, processed by the bridge device and either written back to the fast block I/O device or used to calculate results which are passed back to the controller.

In an example embodiment, the bridge device is configured to perform a context-aware service where the bridge device is aware of the block-level (LBA) structure of the data as well as higher layer contexts such as file-system, or file-type, or both.

In an example embodiment, the command comprises a field and a plurality of processing steps, and wherein the bridge device performs a subset of the plurality of processing steps based on a value in the field.

In an example embodiment, the bridge device further comprises: a buffer memory configured to buffer data as the data flows between the processor and the fast block I/O device; and a computation engine configured to manipulate a first set of data stored in a first location in the buffer memory.

In an example embodiment, the computation engine is configured to obtain the drive data from the fast block I/O device and to store the drive data as the first set of stored data in the first location in the buffer memory.

In an example embodiment, the computation engine is configured to generate a second set of data based on the manipulation of the first set of data, and to store the second set of data in the first location in the buffer memory for transfer to the fast block I/O device, overwriting the first set of data.

In an example embodiment, the computation engine is configured to generate a second set of data based on the manipulation of the first set of data, and to store the second set of data in a second location in the buffer memory for transfer to the fast block I/O device. In an example embodiment, the computation engine is configured to transfer both the first and second sets of data to the fast block I/O device.

In an example embodiment, the computation engine is configured to generate a metric of the first set of data and to store the metric in a third location in the buffer memory, the metric not being for transfer to the fast block I/O device.

In an example embodiment, the command is sent from the processor according to a first protocol, the bridge communicates with the fast block I/O device using a second protocol, and the computation engine is configured to provide protocol translation between the first protocol and the second protocol, and to initiate sending of a translated command to the fast block I/O device based on the protocol translation of the command intercepted from the processor.

In an example embodiment, the bridge device further comprises a DMA (Direct Memory Access) engine in communication with the buffer memory using standard DMA access semantics.

In an example embodiment, the system further comprises: a system memory in communication with the processor. The command sent from the processor to the fast block I/O device relates to a data block stored in the system memory. The computation engine comprises a direct memory access (DMA) engine configured to pull the data block from the system memory to the buffer memory.

In an example embodiment, the buffer memory is implemented in: SRAM on an ASIC in the bridge device; SRAM on an FPGA in the bridge device; or DRAM attached to the bridge device.

In an example embodiment, the bridge device comprises an FPGA, a DSP bridge, or any processing unit.

In an example embodiment, the direct connection of the bridge device and the fast block I/O device is a communication bus-free direct connection.

In an example embodiment, the fast block I/O device comprises a non-volatile memory array, or a solid state hard drive (SSD).

In an example embodiment, the controller comprises a host processor.

In another embodiment, the present disclosure provides a method comprising: receiving, at a bridge device, a command sent from a controller and intended for a fast block I/O device; initiating, at the bridge device, a drive data transfer operation with respect to the fast block I/O device, the drive data being associated with the received command, the bridge device being directly connected to the fast block I/O device; and processing the received command at the bridge device independent of interaction with the controller.

In an example embodiment, initiating the drive data transfer operation comprises initiating a reading of drive data from the fast block I/O device.

In an example embodiment, initiating the drive data transfer operation comprises initiating a writing of drive data to the fast block I/O device.

In an example embodiment, the fast block I/O device comprises a non-volatile memory array, or a solid state hard drive (SSD).

In a further embodiment, the present disclosure provides a non-transitory machine readable medium having stored thereon statements and instructions for execution by a bridge device processor to perform a method as described and illustrated herein.

In another embodiment, the present disclosure provides a bridge device for communication with a controller and a fast block input/output (I/O) device, the bridge device comprising: a receiver for receiving a command sent from the controller and intended for the fast block I/O device; an initiator for initiating a reading of drive data from the fast block I/O device, the drive data being associated with the received command, the bridge device being directly connected to the fast block I/O device; and a processor for processing the received command at the bridge device independent of interaction with the controller.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

Certain embodiments of the present disclosure are described in relation to specific examples of fast block I/O devices, such as SSDs. One of ordinary skill in the art will understand that, according to other embodiments of the present disclosure, those embodiments involving SSDs can be provided in relation to fast block I/O devices other than SSDs, such as a non-volatile memory array or a quantum state store. Discussion of SSDs herein can represent any type of SSD, including an SSD based on NAND flash, or an SSD with non-NAND flash.

In an embodiment, the present disclosure provides a method for using memory constructs to facilitate data manipulation as the data is transferred to and from storage devices. In an example embodiment, the method uses advanced protocols such as NVM Express, and in some embodiments enables near-data processing or protocol translation, or both.

In-situ processing is used to offload processing from the CPU and an interconnect between the CPU and the storage device. Consider a simple example of searching a 4 TB image database for pictures of the Eiffel Tower. In traditional processing, all 4 TB must be read from the SSD and processed inside an x86 CPU. In in-situ processing, the transfer no longer has to occur, and the processing occurs in a dedicated engine in the SSD. Uses include graphing, hash-keying (for databases), image and voice, facial recognition etc. However, in-situ processing has some challenges. The biggest challenge is that the CPUs inside the SSD lack performance required for such processing.

According to embodiments of the present disclosure, a bridge device is provided to allow for near-data processing, or processing that is performed in a device near a data storage location. In an embodiment, near-data processing is performed in the bridge device which, in an example embodiment, is directly connected to the SSD. In another embodiment, near-data processing is performed in a device that is closer to the SSD than a CPU with which the SSD is in communication. Near-data processing can be described as "almost in-situ" processing. As far as the host CPU is concerned, it talks directly to the SSD. The bridge device intercepts NVMe commands when needed to perform the near-data processing near the data on the SSD. Near-data processing can be referred to as in-situ processing within the bridge device, rather than in the SSD.

In addition, new protocols for SSDs are emerging such as Intel's OmniFabric and IBM's CAPI. Rather than design a SSD controller for each one, embodiments of the present disclosure bridge between the new protocols and NVM Express; this reduces risk and design time.

FIG. 1 illustrates a system 100 according to an embodiment of the present disclosure including a bridge device 110.

In the present disclosure, a bridge device comprises a device that performs a translation, or data manipulation, or both. The system of FIG. 1 provides a non-typical Direct Attach Storage (DAS) scenario in which a fast block I/O device 120, such as a solid state device, is attached to a host processor or controller 130, such as a CPU.

In FIG. 1, the bridge device 110 and a memory 140, which can be in the form of DRAM, are connected to the controller 130. In an embodiment, a target memory region 142 in the memory 140 contains or stores target data which is the target of a command or an operation, such as a move command, in relation to the fast block I/O device 120. According to embodiments of the present disclosure, there are a variety of ways this target data can be moved from the target memory region, including using load/store memory semantics or Direct Memory Access (DMA) engines in the bridge device 110.

In the embodiment of FIG. 1, the bridge device 110 is directly connected to the fast block I/O device 120 and in communication with the controller or host processor 130. In an embodiment, the bridge device 110 is configured to intercept a command sent from the controller 130 to the fast block I/O device 120 and to process the command within the bridge device 110.

Figure 2:
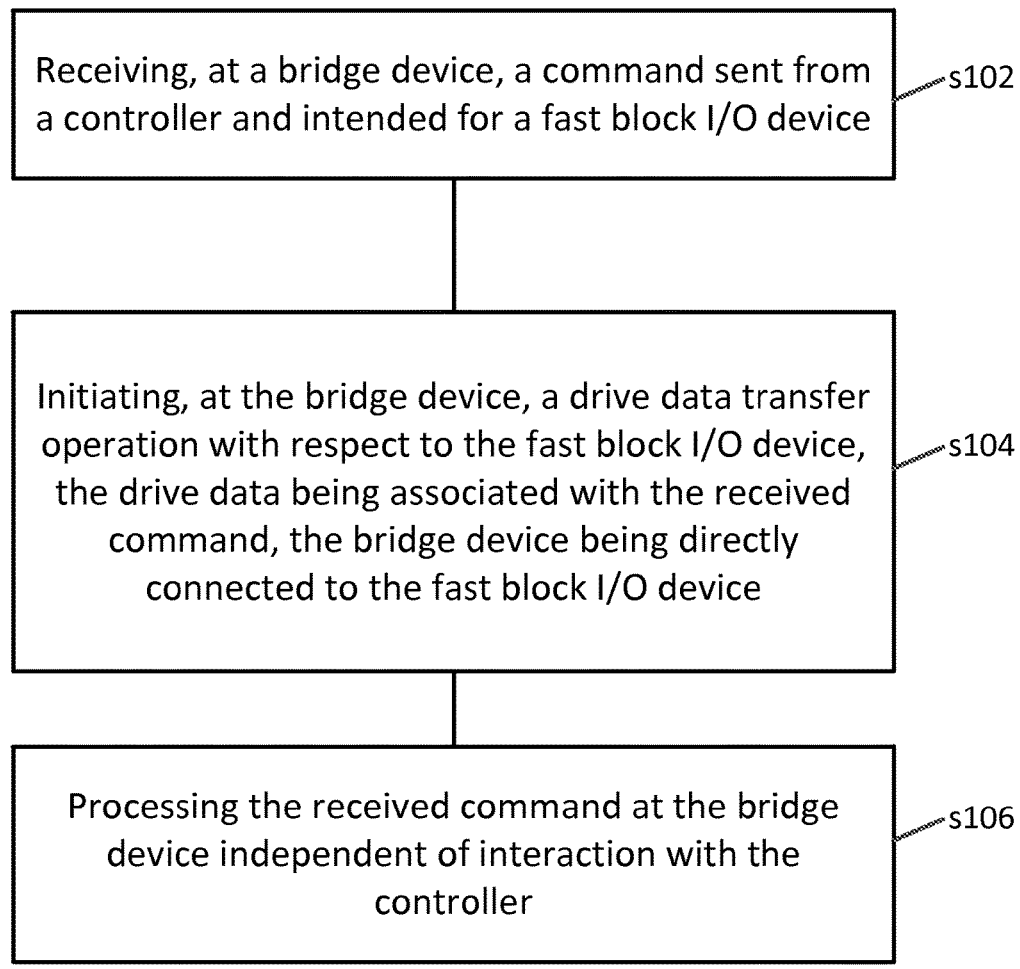
FIG. 2 is a flowchart illustrating a method according to an embodiment of the present disclosure.

FIG. 2 is a flowchart illustrating a method according to an embodiment of the present disclosure. The method comprises, at s102, receiving, at a bridge device, a command sent from a controller and intended for a fast block I/O device. The method comprises, at s104, initiating, at the bridge device, a drive data transfer operation with respect to the fast block I/O device. The drive data is associated with the received command. The bridge device is directly connected to the fast block I/O device. The method further comprises, at s106, processing the received command at the bridge device independent of interaction with the controller.

In an example embodiment, s104 of initiating the drive data transfer operation comprises initiating a reading of drive data from the fast block I/O device. In another example embodiment, s104 of initiating the drive data transfer operation comprises writing drive data to the fast block I/O device.

According to embodiments of the present disclosure, the bridge device 110 of FIG. 1 can be configured to process a command, such as in s106 in FIG. 2, to provide one or more features. In an embodiment, processing the command results in copying or moving target data stored in the target memory region 142 to a corresponding region in the fast block I/O device 120. Various embodiments are described below with respect to processing a command, such as in s106 of FIG. 2.

In an embodiment, the bridge device 110 is configured to perform a protocol translation between a first protocol used for communication with the controller and a second protocol used for communication with the fast block I/O device. The first and second protocols are shown in FIG. 1 as Protocol A and Protocol B, respectively.

In an embodiment, the bridge device 110 is configured to perform data manipulation on data as it flows between the controller and the fast block I/O device.

In an embodiment, the bridge device 110 is configured to perform near-data processing, or in-situ processing in the bridge device, whereby data is read from the fast block I/O device 120, processed by the bridge device 110 and either written back to the fast block I/O device 120 or used to calculate certain results which may be passed back to the controller 130.

In an embodiment, the bridge device 110 is configured to perform a context-aware service where the bridge device is not only aware of the block-level (LBA) structure of the data but is aware of the higher layer contexts such as file-system, or file-type, or both, depending on the circumstances.

In an embodiment, a command comprises a number of associated processing steps. In an embodiment, the bridge device performs a subset of the processing steps associated with the command. In an example embodiment, a field is provided in the command that contains a value; in response to a determination that the value meets a command processing criterion, the processing is performed on the bridge device. The fast block I/O device is a dumb device, which stores data and returns it at a later time. In the embodiment of FIG. 1, the bridge device 110 is directly connected to the fast block I/O device 120. In another embodiment, the bridge device is integral with the fast block I/O device.

Embodiments of the present disclosure, in contrast to existing approaches, provide a processing unit directly connected to a fast block I/O device or non-volatile memory array, and configured to act as a transparent or non-transparent bridge for translating commands. The commands are communicated over a bus, between a host processor and the non-volatile memory array.

Figure 3:
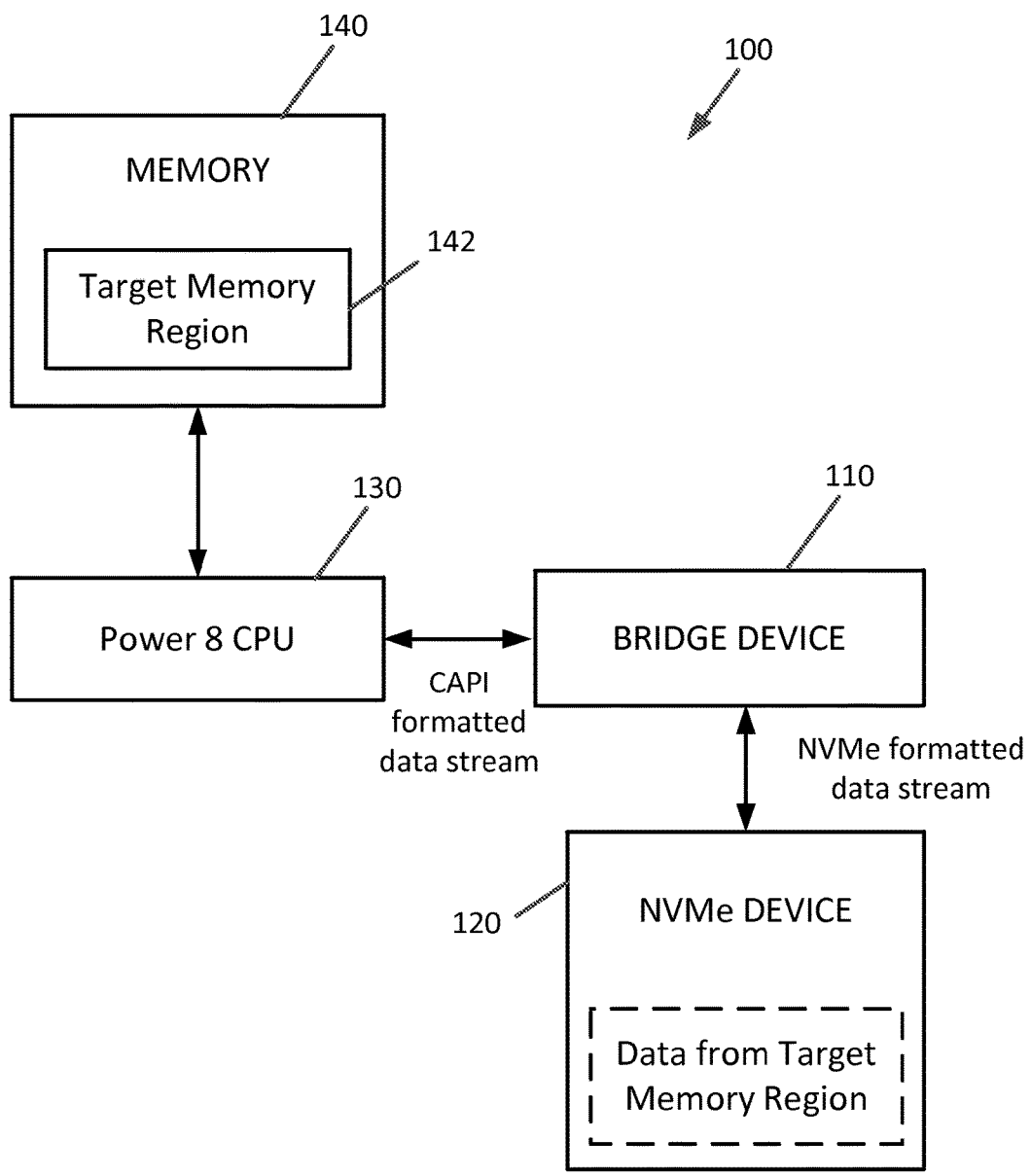
FIG. 3 illustrates a system according to another embodiment of the present disclosure including a bridge device.

FIG. 3 illustrates a system according to another embodiment of the present disclosure including a bridge device. FIG. 3 can be described as a specific embodiment of the general embodiment of the system of FIG. 1. In FIG. 3, the memory 140 and the bridge device 110 are connected to a CPU 130, for example an Intel, IBM or ARM based CPU, such as a Power 8 CPU. The fast block I/O device is provided in FIG. 3 as an NVMe device. As shown in FIG. 3, the CPU 130 communicates with the bridge device 110 using the CAPI protocol, and the bridge device communicates with the NVMe device 120 using the NVMe protocol. The bridge device 110 provides or performs protocol translation between the CAPI protocol and the NVMe protocol.

In the embodiment of FIG. 3, target data from the target memory region 142 is moved from CPU memory to/from the NVMe SSD by leveraging the coherency aspects of CAPI with the memory structures of NVMe. According to these coherency aspects, CAPI can place target data, or memory contents, directly into remote NVMe queues. In both protocols, the target data, or underlying data, is the same, but the encapsulation of the data is different. For example, as shown in the example embodiment of FIG. 3, the target data is encapsulated in a CAPI formatted data stream. The bridge device then performs protocol translation such that the target data is encapsulated in an NVMe formatted data stream.

According to an embodiment of the present disclosure, the system provides address mapping. An example embodiment including address mapping will now be described in relation the CAPI-NVMe example in FIG. 3. In CAPI it is possible to expose additional memory behind a PCIe device and advertise this memory behind the PCIe device to the CPU as additional memory resources that can be read/written. This memory is presented as a range of memory addresses that can be accessed using load/store semantics. In addition, these addresses are coherent in the sense that any changes to these memory locations are reflected in the contents of any caches that exist within the coherency domain.

In an embodiment of the present disclosure, the NVMe device 120 comprises SSD memory (which is slow), and which is exposed to the CPU 130 using the CAPI protocol; data in the SSD 120 is backed up using a block orientated protocol, such as NVM Express. In an example embodiment, the behavior for a write is as follows: the CPU 130 pushes an amount of data to the bridge device's exposed memory using the CAPI protocol; the CPU 130 notifies that the task is completed; the bridge device 110 takes this data and pushes it to the NVMe SSD 120 using the NVMe protocol.

Figure 4:
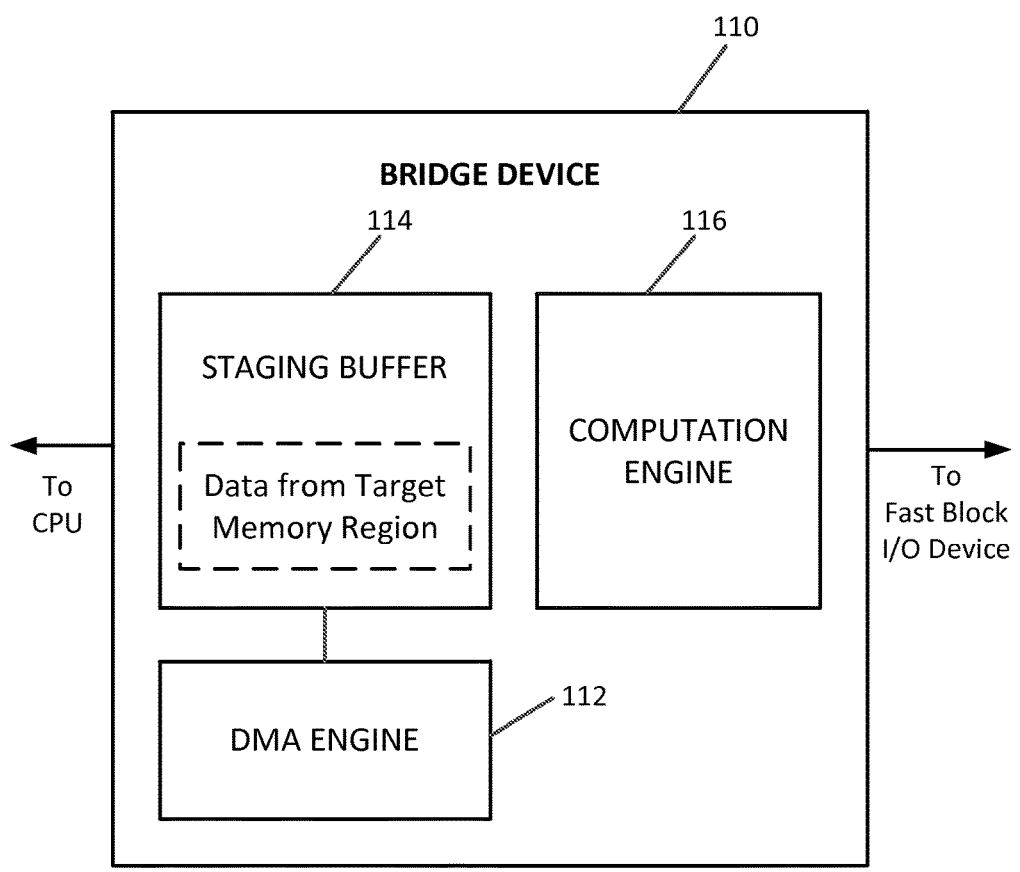
FIG. 4 illustrates a block diagram of a bridge device according to an embodiment of the present disclosure.

FIG. 4 illustrates a block diagram of a bridge device according to an embodiment of the present disclosure. The bridge device in FIG. 4 includes a DMA engine 112, a staging buffer 114 and a computation engine 116.

The DMA engine 112 in the bridge device can be configured to pull data from the target memory region 142 in FIGS. 1 and 2 into the staging buffer 114 inside the bridge device 110. In an embodiment, the DMA engine 112 is in communication with, or connected to, the staging buffer 114 using standard DMA access semantics; in an example implementation, the DMA engine pushes and pulls memory cache line data into the staging buffer 114. In an example embodiment, the DMA engine 112 and computation engine 116 communicate data via the staging buffer 114, rather than through a direct connection.

The staging buffer 114 in the bridge device 110 can be implemented in SRAM on an ASIC, SRAM on an FPGA, or another memory implementation. In an embodiment, the staging buffer 114 is implemented in a memory element already provided in the bridge device 110 that can be used as a buffer for data as it flows from the CPU to the SSD (and vice versa). In another embodiment, the staging buffer 114 is provided in DRAM or another type of memory in communication with, or attached to, the bridge device 110.

The computation engine 116 in FIG. 4 is configured to read data from the SSD and manipulate data in the staging buffer 114 in some manner. The bridge device 110, and in some embodiments the computation engine 116, then performs one or more of the following:

1) Simply acting as a staging area for transfer to the SSD via the DMA engine inside the SSD. In this case the computation engine 116 may provide assistance with tasks such as initiation of the NVM Express commands. This can be described as a protocol translation mode.

2) Manipulate the data and return the new data to the original location in the staging buffer for transfer to the SSD. This can be described as data-manipulation on route to the SSD.

3) Manipulate the data and return the new data to a new location on the SSD. In this example, either just the new data or both the original and new data may be passed to the SSD. This can be described as data manipulation and augmentation. Note that this new physical location can be the same logical location as the original location, so this movement is transparent to the CPU. In another embodiment, the new physical location is a new logical location, in which case some communication between the bridge and the CPU may be needed to inform the CPU that the data is now in a new logical location.

4) Manipulating the data and calculating a metric of, or performing analysis on, the data. The data generation can be based on a store method. In an embodiment, the data is not passed to the SSD. In another embodiment, the calculated metric data is passed to the SSD. In this case, data acceleration is being performed in a manner unrelated to data storage.

Figure 5:
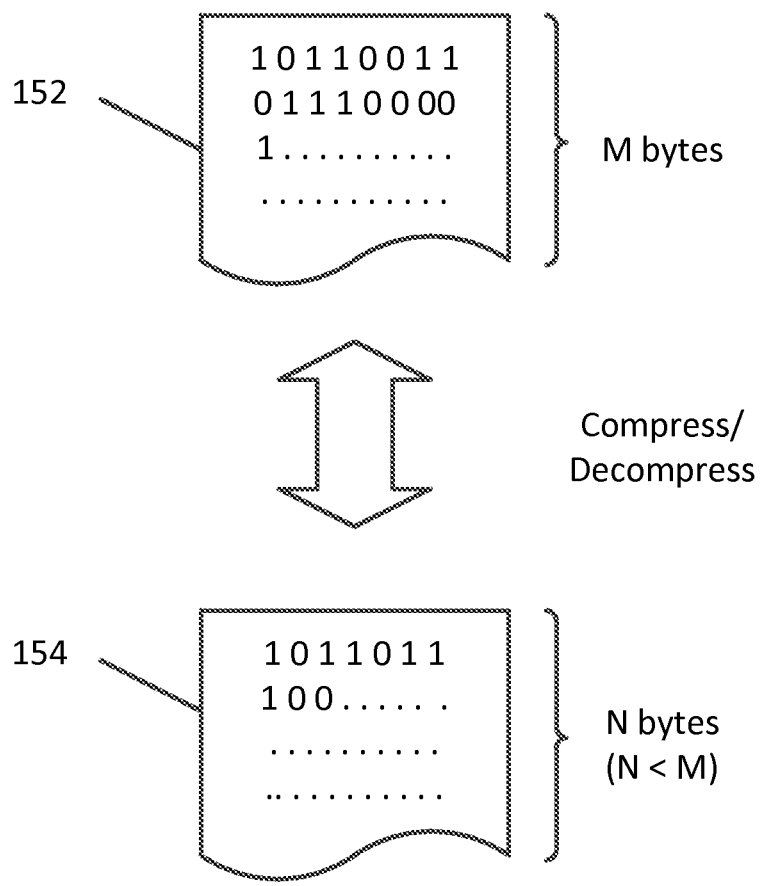
FIG. 5 illustrates data manipulation performed as compression or decompression according to an embodiment of the present disclosure.

Three examples of data manipulation will now be described. The data manipulation is with respect to data going through a bridge device. In a first example, the data manipulation comprises compression or decompression, as illustrated in FIG. 5. There are many types of compression methods or algorithms. In an example embodiment, the compression/decompression method can operate on the data as it is being written to the drive to reduce the amount of data actually written to the drive. As shown in FIG. 5, a set of compressed data 152 has a size of M bytes, and a set of decompressed data 154 has a size of N bytes, where N<M, and N and M are both positive integers. The compression/decompression form of data manipulation can either compress or decompress data as shown. Selected sample compressed and uncompressed data values are illustrated as an example only.

Figure 6:
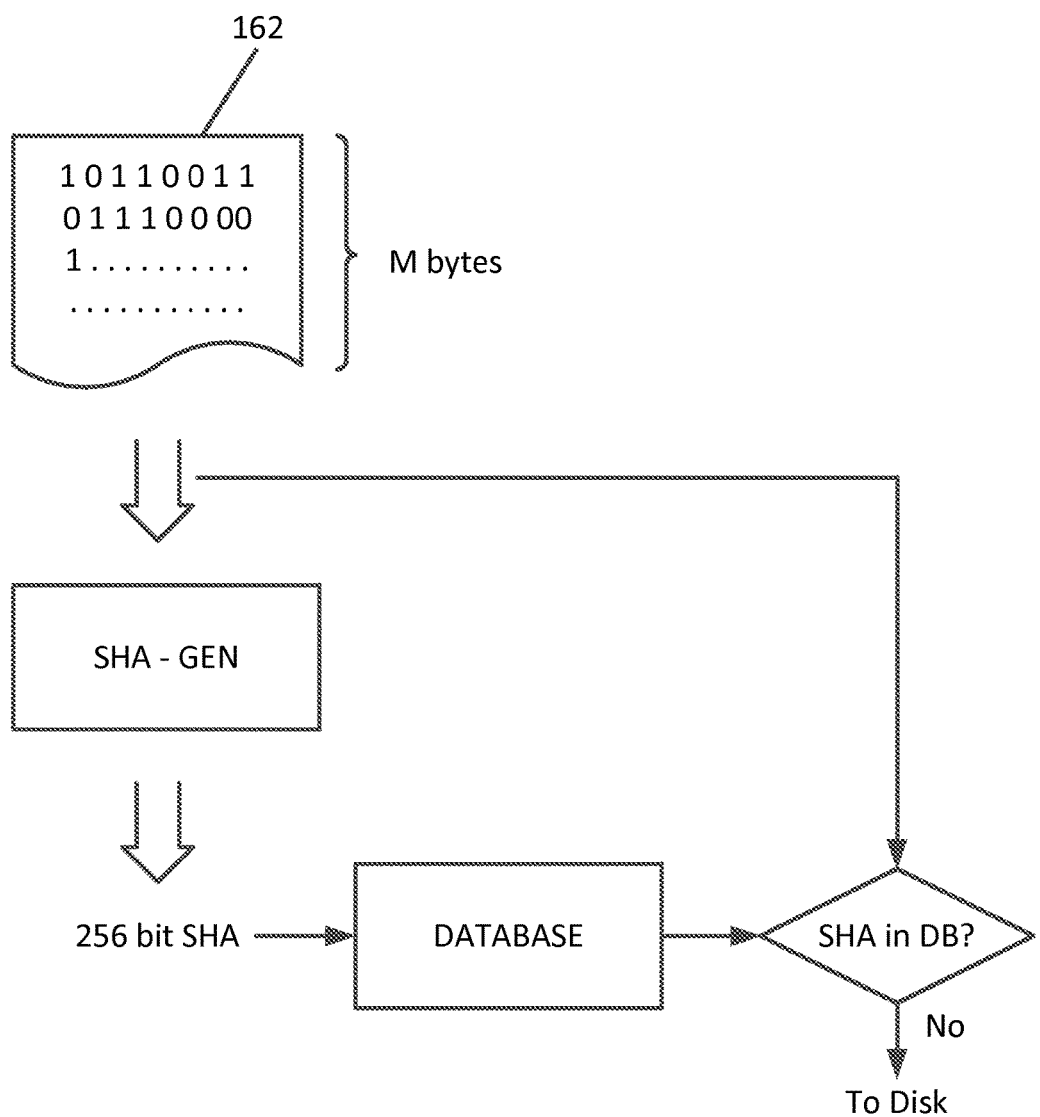
FIG. 6 illustrates data manipulation performed as deduplication according to an embodiment of the present disclosure.

In a second example, the data manipulation comprises deduplication, as illustrated in FIG. 6. In an example embodiment, which begins with a set of data 162 of size of M bytes, the deduplication is performed by generating a key, such as a SHA key, for each of a plurality of sets of data, and then determining whether that SHA key is unique within the plurality of SHA keys generated corresponding to the plurality of sets of data. The data is only written to the disk, or fast block I/O device, if the SHA is not in the database.

Figure 7:
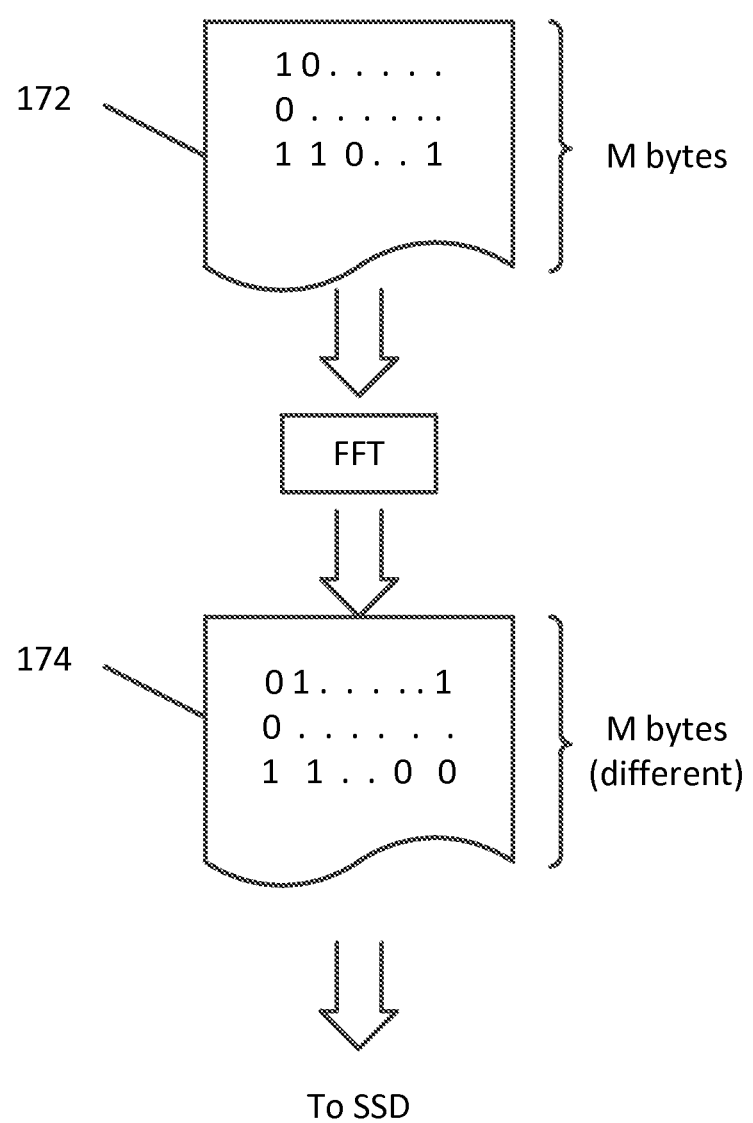
FIG. 7 illustrates data manipulation performed as a Fast-Fourier Transform according to an embodiment of the present disclosure.

In a third example, the data manipulation comprises a Fast-Fourier Transform (FFT), as illustrated in FIG. 7. In an example embodiment, for tasks such as image processing, data is stored as an FFT of the original data to facilitate later manipulation. As shown in FIG. 7, an initial set of data 172 has a size of M bytes, and undergoes an FFT operation, outputting an output set of data 174. The output set of data 174 also has a size of M bytes, but the content of the output set of data 174 is different than the initial set of data 172 due to the FFT operation. Selected sample initial and output data values are illustrated as an example only.

In an example embodiment in which the task performed by the computation engine 116 needs some understanding of the nature of the files on which it is operating (e.g. facial recognition in JPEG images), the following three tasks can be performed in relation to an image-related command:

1) Identify which of the blocks being transferred are part of the image stream.

2) Identify the blocks of data that form a single image and identify which part of the image they belong to.

3) Ensure the computation engine is aware of the particular format in question. This opens up the opportunity to perform context-aware operations, while adding complexity to the computation engine.

There are several possible methods for identifying the context specific data and separating it from generic data. These methods can be used regardless of whether the connection to the CPU is memory based or block based:

1) Separate queues on the CPU can be used to isolate context specific data from generic data. Since the CPU knows which data is which, it can direct it to the appropriate queue. This also helps with the ordering problem since the bridge device can use FIFO queuing to pull the data from the queues.

2) Tagging can be used with meta-data fields to denote the context specific data cache lines/regions.

In some embodiments, the SSD is almost always not able to comprehend context. In such embodiments, the context specific information will need to be stripped off the data on its way to the SSD, or be embedded in the meta-data portion of the data being written to the SSD.

In contrast to context-awareness that is commonly used in compute accelerators (e.g. GPUs and FPGA cards) with a memory-type interface, embodiments of the present disclosure provide context-awareness to a storage device that lies behind the bridge and that uses a block interface. For example, in storage semantics, processing is performed with respect to an integer number of blocks. Those blocks can be, or represent, pictures, sound or other data types. Embodiments of the present disclosure use block meta-data as part of the context-awareness to indicate what the objects are, for example by indicating a data type, and where the objects start and stop.

In an example embodiment, in performing a context-aware service, the bridge device 110 is aware what data type is being passed to the bridge device 110 from the CPU 130 or SSD 120. In an example embodiment, a field inside a write command is used to indicate a data type, for example, indicating if the data is image data (e.g. JPEG) or audio data (e.g. mp4). In response to identification of a data type, the bridge device determines the data on which it can perform image processing or audio processing services.

For example, the bridge device 110 can be configured to perform image processing on a first set of data in response to an identification of the first set of data comprising image data. In an example embodiment, in the "Eiffel Tower" search example given above, using context aware services the bridge device can skip any non-image data and focus the near-data processing only on image data.

Quite a few modes of operation can co-exist at the same time. In addition, if the computation engine 116 has some degrees of flexibility, the data manipulation at a given time might vary from the manipulation in the past and future. This can be implemented, for example, in an embodiment in which the computation engine 116 is a FPGA, GPU or even an embedded processor.

A similar approach can be taken on the read path where data is read from the SSD and returned to the memory on the CPU.

In the case of near-data processing, or in-situ processing in the bridge device, the CPU initiates a request to the bridge device to perform some operation on the data on the SSD. At this point the CPU takes no further action and instead it is the job of the computation engine to read the data from the SSD and place it in the staging buffer for manipulation or analysis.

Figure 8:
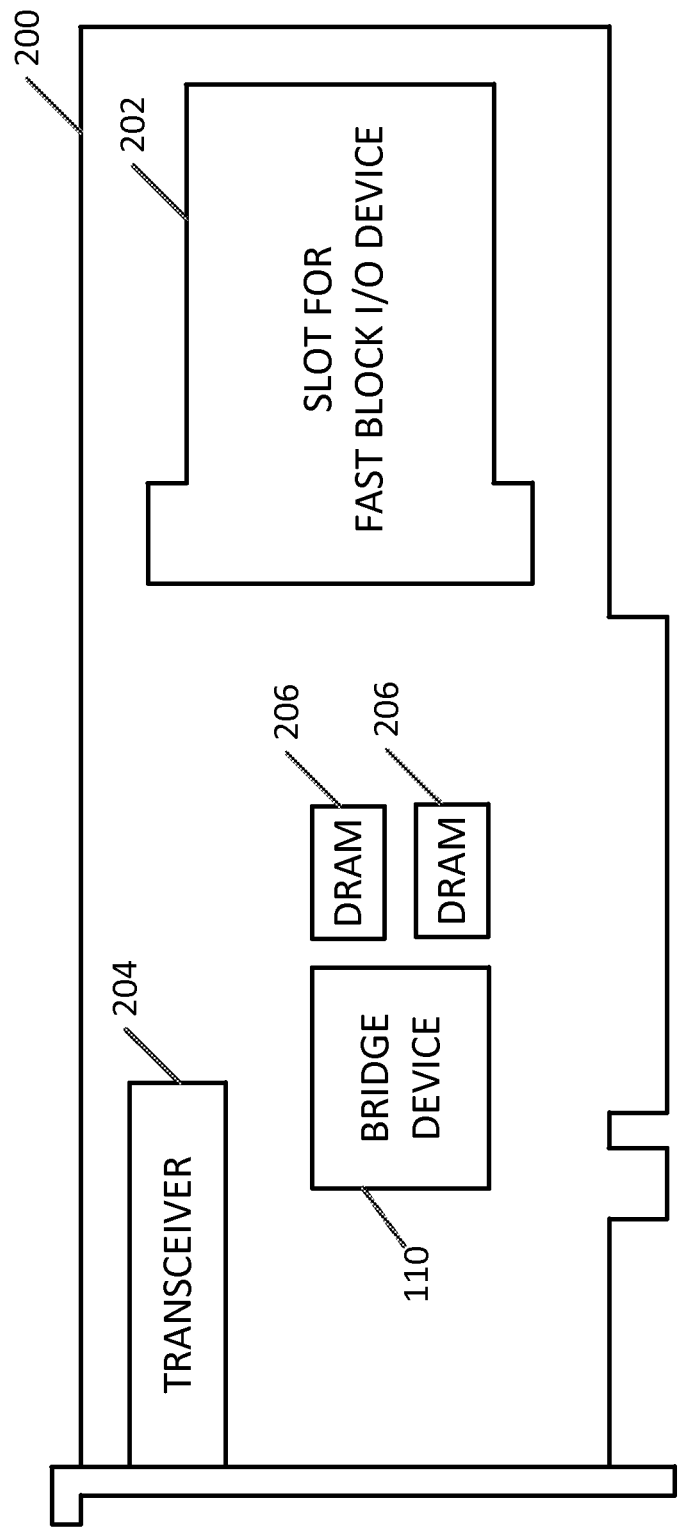
FIG. 8 illustrates a line card according to an embodiment of the present disclosure.

FIG. 8 illustrates a line card 200 according to an embodiment of the present disclosure. The example embodiment of FIG. 8 can be described as showing the bridge device 110 of FIG. 1, and further including a fast block I/O device receiver 202 in which the fast block I/O device 120 (not shown in FIG. 8, but shown in FIG. 1) is received. In an example embodiment, the fast block I/O device receiver 202 comprises an SSD cage or an SSD slot. In an example embodiment, the SSD cage is oriented horizontally to allow for cold/hot swap. In an example embodiment, the fast block I/O device receiver 202 is shaped and constructed to receive an SSD, such as a 2.5" SFF-8639 with standard NVMe SSD.

In an embodiment, the line card 200 of FIG. 8 comprises a transceiver 204. In an example embodiment, the transceiver 204 comprises a small form-factor pluggable (SPF) or enhanced small form-factor pluggable (SFP+) transceiver. In an embodiment, the line card 200 comprises a connector, such as a PCIe Gen 3.0×16 that connects an FPGA to a CPU such as an x86 or Power8/9. In an embodiment, DRAM memory 206 in FIG. 8 is an implementation of the staging buffer 112 of FIG. 4, and is used to temporarily buffer the data on its way from the CPU to the storage device. In an embodiment, the DRAM memory 206 is used to stage the data before it is manipulated.

The example embodiment of FIG. 8 can address one or more of the three functional areas discussed above, for example with respect to processing a command, such as in s106 of FIG. 2, namely:

1) Perform a protocol translation between the protocol spoken by the CPU and the protocol spoken by the SSD.

2) Perform data manipulation on data as it flow form the CPU to the SSD (or vice-versa).

3) Perform near-data processing, or in-situ processing in the bridge device, whereby data is read from the SSD, processed by the bridge device and either written back to the SSD or used to calculate certain results which may be passed back to the CPU.

Three examples of near-data processing will now be described. In a first example, consider a drive full of images (e.g. Facebook photos). Rather than performing image classification on these images as they are uploaded to Facebook it might be acceptable for the image classification to occur as a background task (for example, scrubbing). The computation engine, or computational element, 116 can be programmed to perform such feature classification and be told to operate over all the data on the drive.

In a second example, consider a drive full of images. It may be desirable to identify all photos in the drive that contain certain features (e.g. all images of the Eifel Tower). Rather than requiring all the data on the SSD to be passed to a CPU to perform image recognition, embodiments of the present disclosure allow for the image identification to be done by the computation engine 116. Only pointers to matched images need to be returned to the CPU. In an embodiment, a threshold is set to allow all images that are thought to contain the target image to be passed back for a second level identification by the CPU.

In a third example, consider a drive full of database data in JSON form. It may be desirable to identify all database entries that match certain criteria (e.g. all males over the age of 47). Again, rather than pulling all the SSD data back to the CPU a search can be done by the computational engine and a pointer list can be passed back to the CPU.

In the embodiment of FIG. 8, the protocol translation is between the IBM CAPI protocol and NVM Express and is handled by the bridge device, which can be a system on a chip (SoC), for example implemented as an FPGA. In addition, the resources on the FPGA can be used to perform data manipulation on data going to the SSD (e.g. compression or encryption) and data coming from the SSD (e.g. decompression and decryption).

According to one or more embodiments of the present disclosure, the bridge device can perform one or more of the following protocol translations: CAPI (Host) to NVM Express; NVM Express (HOST) to SATA/SAS; CAPI (Host) to Ethernet.

Also, embodiments of the present disclosure perform near-data processing, or in-situ processing within the bridge device itself, rather than in the fast block I/O device. The near-data processing is an example of processing a command, such as in s106 of FIG. 2. An example of how the near-data processing can be implemented is provided below.

1) Assume the SSD contains a large dataset of images that have yet to be tagged.

2) The CPU pushes programmable logic onto the bridge device (for example, an FPGA) which performs image recognition looking for key features (for example faces).

3) The CPU can then ask the FPGA to pull all the images for the SSD and augment the data on the SSD with meta-data indicating where, on each image, a face occurs and to inform the CPU when the task is completed.

4) The FPGA can then read all the data from the SSD and perform the face location detection on each image. It can then write the meta-data to the SSD beside the original images.

5) Once the task is complete the FPGA can inform the CPU which can then use the meta-data to provide services to customers or perform more advanced processing on the data.

In an embodiment, during steps 3-5 inclusive, the CPU is free to work on tasks are more suited to the CPU than the task assigned to the FPGA. In this way, processing power efficiency is maximized.

In an example embodiment, data moves from the CPU out through the bridge device. A connection is established before any data movement. The connection establishment can comprise informing the bridge what is to happen to the data. For example, suppose data is being written to the SSD. In the write commands, or prior to sending the write commands, an instruction is provided or sent regarding what is to happen to the data (e.g. compression, deduplication, protocol translation). As described above, the bridge device may talk to the host in a different language than with the SSD.

Figure 9:
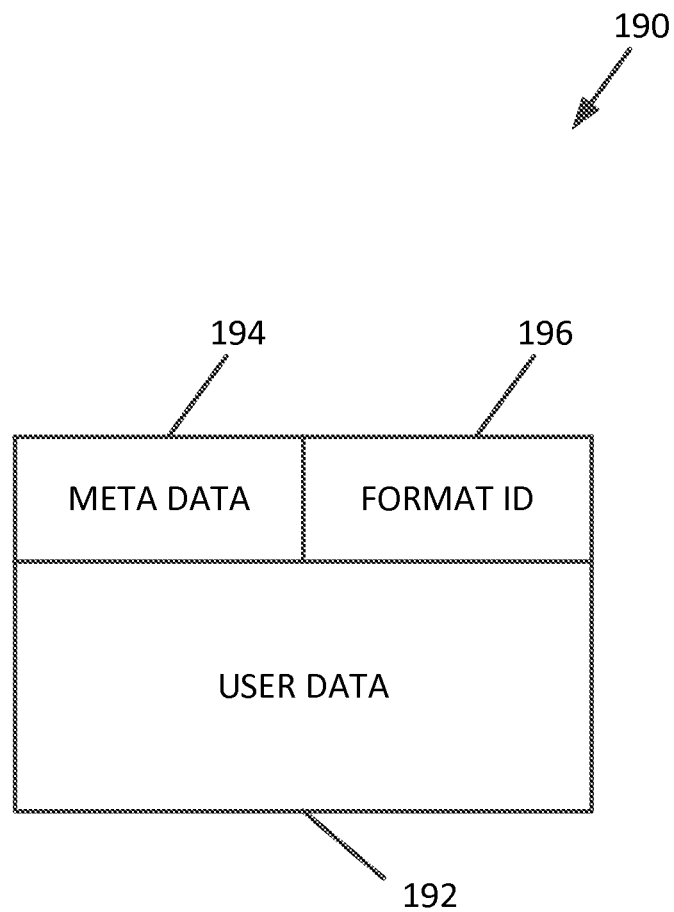
FIG. 9 illustrates a command structure used in relation to data manipulation according to an embodiment of the present disclosure.

For a write command, there is an instruction associated with the command, which in an embodiment comprises a command operator that can specify where to put the data on drive, or what kind of metadata to attach, or both. An example embodiment of a command structure 190 is shown in FIG. 9, which shows the command structure including user data 192 and meta data 194. In addition to the command operator, the instruction or command can comprise a format ID field 196 inside the command structure to manipulate the data in some way. For example, a value of 7 in the format ID field 196 can be assigned to mean a certain type of manipulation is performed before the data ends up on the SSD. The bridge device 110 can use the format ID field 196 to provide one or more context-aware service. In an example embodiment, the format ID field 196 can be integral with the meta data 194, such as being a portion of the meta data.

In an example embodiment, the present disclosure provides an apparatus comprising a line card such as illustrated in FIG. 8 and described in relation thereto. In another example embodiment, the present disclosure provides a bridge device for use in a line card, such as described and illustrated in relation to FIGS. 1-9.

In an example embodiment, the present disclosure provides an NVM Express bridge for protocol translation and near-data processing, or in-situ processing in the bridge device directly connected to the fast block I/O device.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed:

1. A system comprising:
    a controller;
    a fast block input/output (I/O) device; and
    a bridge device directly connected to the fast block I/O device and in communication with the controller, the bridge device configured to intercept a command sent from the controller to the fast block I/O device and to process the command within the bridge device independent of interaction with the controller, wherein the processing comprises performing near-data processing, the near-data processing comprising:
        in response to the command, read data from the fast block I/O device;
        process the read data in the bridge device; and
        write the processed read data back into the fast block I/O device, or calculate based on the processed read data results, wherein the results are sent back to the controller.

2. The system of claim 1 wherein the bridge device is configured to obtain drive data from the fast block I/O device to process the command within the bridge device independent of interaction with the controller.

3. The system of claim 1 wherein the bridge device is configured to perform a protocol translation between a first protocol used for communication with the controller and a second protocol used for communication with the fast block I/O device.

4. The system of claim 1 wherein the bridge device is configured to perform data manipulation on data as it flows between the controller and the fast block I/O device.

5. The system of claim 1 wherein the bridge device is configured to perform a contextaware service where the bridge device is aware of the block-level (LBA) structure of the data as well as higher layer contexts such as file-system, or file-type, or both.

6. The system of claim 1 wherein the command comprises a field and a plurality of processing steps, and wherein the bridge device performs a subset of the plurality of processing steps based on a value in the field.

7. The system of claim 2 wherein the bridge device further comprises:
    a buffer memory configured to buffer data as the data flows between the processor and the fast block I/O device; and
    a computation engine configured to manipulate a first set of data stored in a first location in the buffer memory.

8. The system of claim 7 wherein the computation engine is configured to obtain the drive data from the fast block I/O device and to store the drive data as the first set of stored data in the first location in the buffer memory.

9. The system of claim 7 wherein the computation engine is configured to generate a second set of data based on the manipulation of the first set of data, and to store the second set of data in the first location in the buffer memory for transfer to the fast block I/O device, overwriting the first set of data.

10. The system of claim 7 wherein the computation engine is configured to generate a second set of data based on the manipulation of the first set of data, and to store the second set of data in a second location in the buffer memory for transfer to the fast block I/O device.

11. The system of claim 10 wherein the computation engine is configured to transfer both the first and second sets of data to the fast block I/O device.

12. The system of claim 7 wherein the computation engine is configured to generate a metric of the first set of data and to store the metric in a third location in the buffer memory, the metric not being for transfer to the fast block I/O device.

13. The system of claim 7 wherein the command is sent from the processor according to a first protocol, and wherein the bridge communicates with the fast block I/O device using a second protocol, and wherein:
   the computation engine is configured to provide protocol translation between the first protocol and the second protocol, and to initiate sending of a translated command to the fast block I/O device based on the protocol translation of the command intercepted from the processor.

14. The system of claim 7 wherein the bridge device further comprises a DMA (Direct Memory Access) engine in communication with the buffer memory using standard DMA access semantics.

15. The system of claim 1 further comprising:
   a system memory in communication with the processor, wherein the command sent from the processor to the fast block I/O device relates to a data block stored in the system memory; and
   wherein the computation engine comprises a direct memory access (DMA) engine configured to pull the data block from the system memory to the buffer memory.

16. A method comprising:
   receiving, at a bridge device, a command sent from a controller and intended for a fast block I/O device;
   initiating, at the bridge device, a drive data transfer operation with respect to the fast block I/O device, the drive data being associated with the received command, the bridge device being directly connected to the fast block I/O device; and
   processing the received command at the bridge device independent of interaction with the controller, wherein the processing comprises performing near-data processing, the near-data processing comprising:
      in response to the command, read data from the fast block I/O device;
      process the read data in the bridge device; and
      write the processed read data back into the fast block I/O device, or calculate based on the processed read data results, wherein the results are sent back to the controller.

17. The method of claim 16 wherein initiating the drive data transfer operation comprises initiating a reading of drive data from the fast block I/O device.

18. The method of claim 16 wherein initiating the drive data transfer operation comprises initiating a writing of drive data to the fast block I/O device.

19. A bridge device for communication with a controller and a fast block input/output (I/O) device, the bridge device comprising:
   a receiver for receiving a command sent from the controller and intended for the fast block I/O device;
   an initiator for initiating a reading of drive data from the fast block I/O device, the drive data being associated with the received command, the bridge device being directly connected to the fast block I/O device; and
   a processor for processing the received command at the bridge device independent of interaction with the controller, wherein the processing comprises performing near-data processing, the near-data processing comprising:
      in response to the command, read data from the fast block I/O device;
      process the read data in the bridge device; and
      write the processed read data back into the fast block I/O device, or calculate based on the processed read data results, wherein the results are sent back to the controller.

* * * * *